(12) United States Patent
Bohannan et al.

(10) Patent No.: US 6,497,025 B1
(45) Date of Patent: *Dec. 24, 2002

(54) APPARATUS FOR ATTACHING WINDOW HARDWARE

(75) Inventors: David A. Bohannan, Rochester Hills, MI (US); Neil S. Curliss, Oshawa (CA)

(73) Assignee: PPG Industries Ohio, Inc., Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 348 days.

(21) Appl. No.: 08/928,784

(22) Filed: Sep. 12, 1997

(51) Int. Cl.⁷ ................................................ B25B 1/20
(52) U.S. Cl. ........................ 29/281.5; 269/40; 269/296; 269/305
(58) Field of Search ........................ 29/464, 559, 281.1, 29/281.5; 156/71; 269/37, 40, 908, 296, 305, 309, 266

(56) References Cited

U.S. PATENT DOCUMENTS

| 4,776,132 A | | 10/1988 | Gold | |
|---|---|---|---|---|
| 4,835,908 A | | 6/1989 | Londeck et al. | |
| 4,943,179 A | | 7/1990 | Horiki et al. | |
| 4,951,931 A | * | 8/1990 | Rossi | 269/305 |
| 5,194,028 A | * | 3/1993 | Onishi | 269/908 |
| 5,226,259 A | | 7/1993 | Yamagata et al. | |

* cited by examiner

Primary Examiner—Robert C. Watson
(74) Attorney, Agent, or Firm—Kenneth J. Stachel; Andrew C. Siminerio

(57) ABSTRACT

The present invention provides a fixture for securing hardware to a shaped sheet. The fixture includes supports having sheet supporting surfaces generally corresponding to a desired elevational contour of selected portions of a sheet to be supported and a holder to support hardware to be secured to the supported sheet at a predetermined location and orientation corresponding to a desired location and orientation of the hardware when secured to a sheet shaped to a desired configuration. In one particular embodiment of the invention, the sheet supporting surfaces correspond to selected marginal edge portions of the supported sheet.

16 Claims, 3 Drawing Sheets

APPARATUS FOR ATTACHING WINDOW HARDWARE

BACKGROUND OF THE INVENTION

1. Field of Invention

This invention relates to securing hardware on a glass substrate and in particular to securing mounting hardware to the vehicle window in a manner that ensures proper positioning and orientation.

2. Technical Considerations

Automotive windows are often provided with arrangements to secure the window to mechanisms which raise and lower the window. These arrangements may include mounting brackets or frames secured to an edge of the window, e.g. as disclosed in U.S. Pat. No. 4,776,132 to Gold; U.S. Pat. No. 4,943,179 to Horiki, et al.; and U.S. Pat. No. 5,226,259 to Yamagata et al., post members extending through the window, e.g. as disclosed in U.S. Pat. No. 4,835,908 to Londeck, et al., or other types of attachment hardware. It is important that the hardware be secured to the window at the correct location and orientation so that they are properly aligned with the window moving mechanism. This is particularly important when the window glass is curved. Variations in the glass curvature at the connection area may result in improper orientation of the attachment hardware with respect to the moving mechanism. As a result, the shape of the glass is critical at the connection area to assure installation of the hardware at the proper orientation.

It would be advantageous to provide an arrangement for securing hardware to the windows that assures its proper position and orientation despite variations in the surface curvature.

SUMMARY OF THE INVENTION

The present invention provides a fixture for securing hardware to a shaped sheet. The fixture includes supports having sheet supporting surfaces generally corresponding to a desired elevational contour of selected portions of a sheet to be supported and a holder to support hardware to be secured to the supported sheet at a predetermined location and orientation corresponding to a desired location and orientation of the hardware when secured to a sheet shaped to a desired configuration. In one particular embodiment of the invention, the sheet supporting surfaces correspond to selected marginal edge portions of the supported sheet.

The present invention also provides a method of securing hardware to a shaped sheet comprising the steps of providing a sheet supporting surface generally corresponding to a desired elevational contour of selected portions of a sheet to be supported, holding hardware to be secured to the sheet at a predetermined location and orientation corresponding to a desired location and orientation of the hardware when the hardware is secured to a sheet having a desired configuration, positioning the sheet on the sheet supporting surface such that the sheet receives the hardware while maintaining the predetermined location and orientation of the hardware, and securing the hardware to the sheet such that the hardware maintains the predetermined location and orientation. In one particular embodiment of the invention, sheet supporting surface generally corresponds to a desired elevational contour of selected marginal edge portions of the sheet to be supported and adhesives are used to secure the hardware to the shaped sheet.

DETAILED DESCRIPTION OF THE INVENTION

The instant invention is presented in combination with securing selected types of attachment hardware to a vehicle window but may be used in combination with other systems where it is important to provide proper orientation when securing members together.

Figure 1:
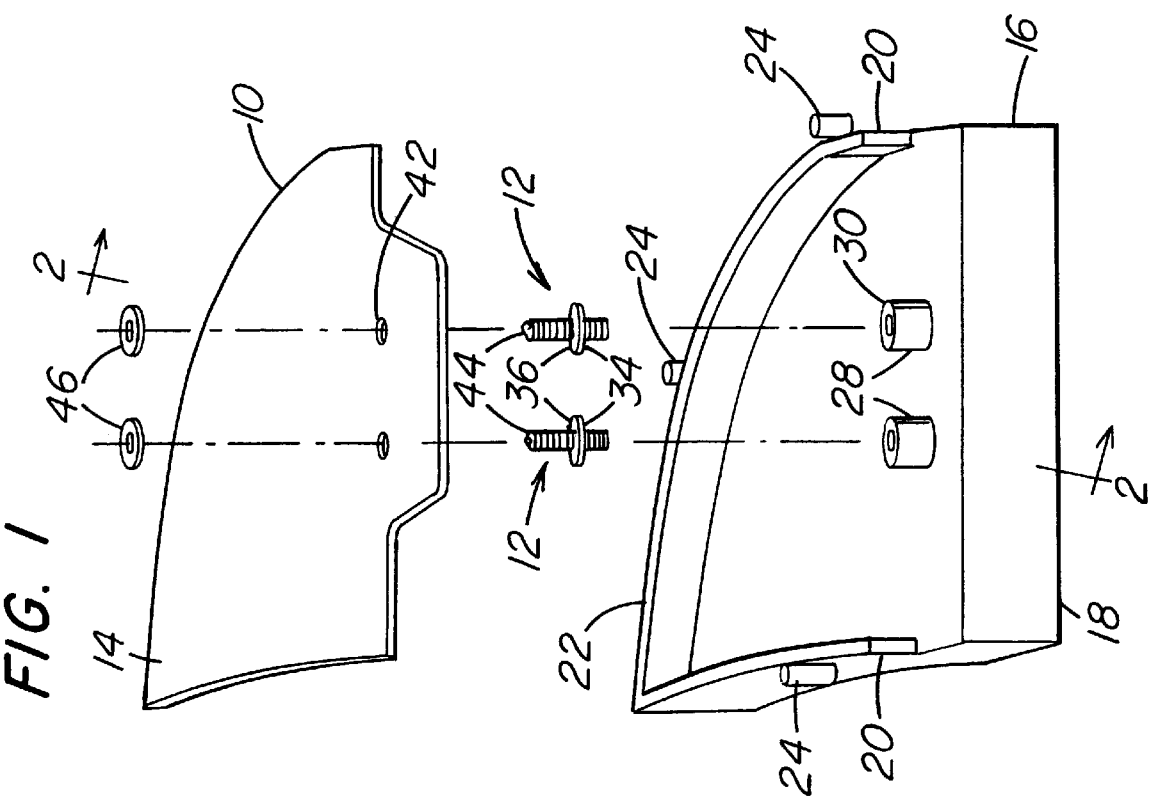
FIG. 1 is an expanded view of a vehicle window, mounting hardware, and a check fixture incorporating features of the present invention.

FIG. 1 illustrates a curved glass window 10 for a motor vehicle and the like having hardware attached to the window. Although not limiting in the present invention, in the particular window 10 illustrated in FIG. 1, the hardware includes mounting studs 12 extending through and secured to the window 10. These studs 12 may be connected to a window regulator (not shown) which is used to raise and lower the window 10 within the vehicle. As an alternative, the studs may be received within openings in the vehicle body and captured by a nut to hold the window in place. Typically, window 10 is shaped to a curvature which matches the contours of the vehicle body into which the window is installed to provide improved vehicle aerodynamics and styling. The window 10 may be shaped in any convenient manner well known in the art.

To ensure consistency in the shaping of the window 10 and in particular, adherence to the desired shape of the window along its marginal edge 14, check fixtures are commonly used within the glass sheet shaping industry, for example as shown by fixture 1 6 in FIG. 1. The fixture 16 includes a base 18 with an elevated ledge 20 that generally corresponds to the periphery of selected edges of the window 10. In the particular arrangement shown in FIG. 1, ledge 20 extends along three sides of fixture 16 to support window 10 along three edges. Surface 22 of the ledge 20 corresponds to the desired elevational contour of corresponding portions of the marginal edge 14 of the window 10. A plurality of stops 24 (three shown in FIG. 1) are positioned along ledge 20 to align the window 10 and establish the correct position of the window 10 relative to ledge 20 when the window 10 is positioned on fixture 16. In practice, to check the elevational contour of the window 16 after shaping, the window 10 is placed on fixture 16 and positioned against stops 24 so that selected marginal edges are supported on corresponding portions of ledge 20. A gage (not shown) is inserted between glass surface 26 of window 10 and ledge surface 22 to determine how closely the marginal edge 14 of the window 10 matches the desired elevational contour.

When structures such as mounting and attachment hardware are positioned against and secured to a major surface of the window 10, the orientation of such structures will depend on the window's surface contour. In instances where the orientation of the structure relative to the window is critical, variations in the surface contours of the window may result in misorientation of such structures.

To overcome this problem and provide consistent and accurate mounting of such hardware structures, the present invention provides a check fixture which further includes features for accurately positioning and orienting such structures. More specifically, fixture 16 of the present invention includes a holder 28 with a surface 30 to support and hold mounting stud 12 at a predetermined location and orientation which corresponds to the location and orientation of the stud 12 when the stud is secured to a window that is correctly formed to the desired configuration. Although not limiting in the present invention, in the particular embodiment illustrated in FIGS. 1–3, holder 28 extends above base 18 and further includes an opening 32 sized to receive post 34 of stud 12. If desired, the size of surface 30 may be reduced and stud 12 may be held in place by post 34 within opening 32. In this particular embodiment of an attachment device, stud 12 further includes a metal washer 36 with an optional plastic facing 37 which prevents direct metal-to-glass contact between stud 12 and glass window 10. Facing 38 further includes a collar section 40 sized to extend within and generally fill a portion of opening 42 in window 10. Stud 12 further includes a threaded post 44 which extends through opening 42. A securing member in the form of a threaded washer 46 having an optional plastic facing 48 and collar 50 is threaded onto post 44 as discussed below.

Figure 3:
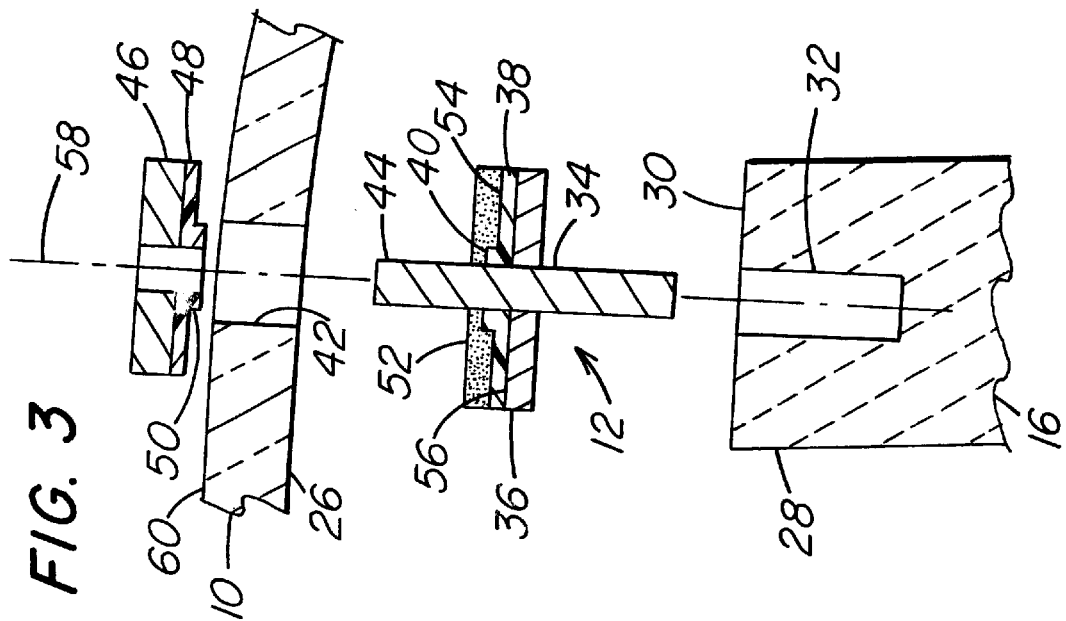
FIG. 3 is an exploded view of FIG. 2, with portions removed for clarity.
Figure 2:
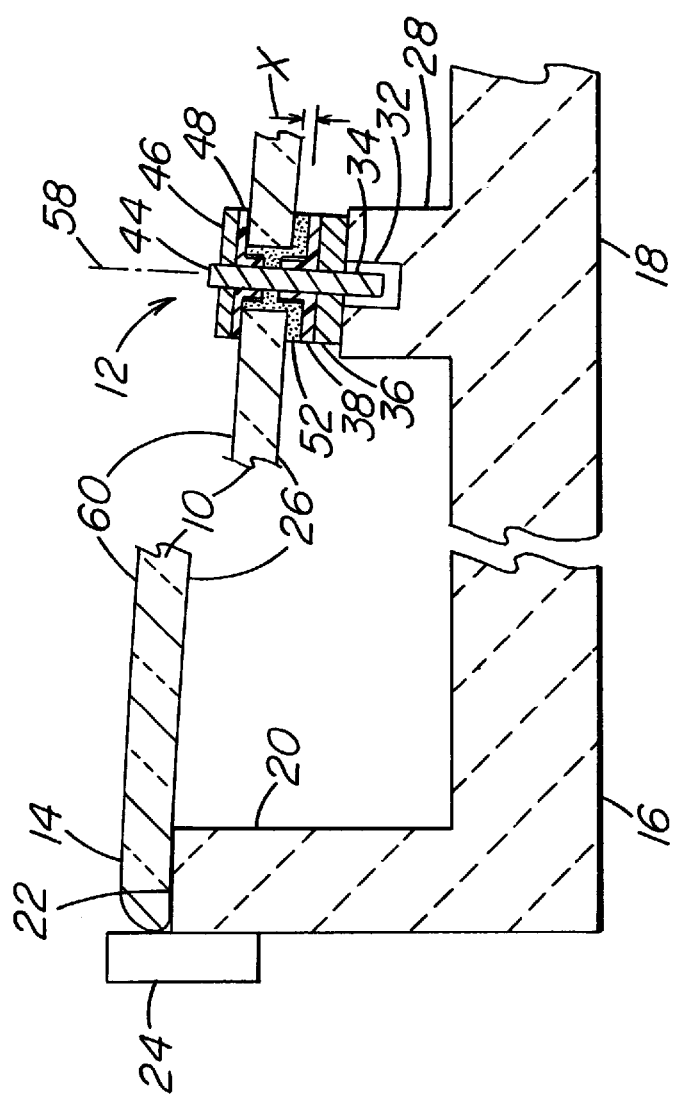
FIG. 2 is a cross sectional view taken along line 2—2 of FIG. 1.

To secure stud 12 to window 10, an adhesive 52 is applied to surface 54 of plastic facing 38 (or to surface 56 of washer 36 if facing 38 is not used), and post 34 of stud 12 is positioned within opening 32 of raised holder 28 of fixture 16 as shown in FIGS. 2 and 3. As discussed earlier, section 28 fixes the position of stud 12 and orients posts 34 and 44 along a desired line 58 as shown in FIGS. 2 and 3. Window 10 is then positioned on fixture 16 and window 10 receives the stud 12, with post 44 extending through opening 42. Because stops 24 and ledge 20 establish a datum corresponding to the desired elevational contour of the marginal edge 14 of window 10 and the position of stud 12 is fixed relative to this datum, the stud 12 will be properly oriented on the glass window 10 regardless of any actual variation in the glass surface at opening 42. After the adhesive 52 sets a sufficient amount to maintain the stud 12 the position and orientation of the stud 12 on window 10, the window 10 may be removed from fixture 16. If desired, washer 46 may be threaded onto post 44 as shown in FIG. 2 to further secure stud 12 to window 10. Adhesive (not shown) may also be applied to washer 36 (or facing 48, if used) to secure the washer to surface 60 of window 10.

Adhesive 52 is applied at a thickness of slightly greater than the final desired spacing, X, between surface 54 of plastic facing 38 (or between surface 56 of washer 36 if facing 38 is not used) and the surface 26 of window 10, as shown in FIG. 2, to allow the adhesive 52 to fill the gap between the glass window 10 and the washer 36 and flow and conform for any non-conformity of window surface 26 at opening 42. In addition, adhesive 52 will flow to fill opening 42. For example, in one particular embodiment of the invention, it is desired that stud 12 be maintained at a distance of 0.75 mm away from surface 26 of a window having the desired surface contour at opening 42. Adhesive 52 is applied on surface 54 as a bead having a minimum thickness of 1.5 mm to allow for any variations in the surface contour as discussed above. The adhesive 52 should be a quick-setting material, preferably one that sets in less than 60 seconds, and should be hard but not brittle when cured. It is also preferred that the material have a high compressive strength so as to distribute any load applied to the stud 12 and not deform when loaded. Although not limiting in the present invention, materials such as thermal set plastics, hot melt epoxies, methylacrylics, and urethanes may be used. In one particular embodiment of the invention, the adhesive is Pliogrip® urethane, which is a two component, quick setting urethane available from Ashland Chemical company, Columbus, Ohio.

It should be appreciated that if the hardware to be secured to the window 10 does not include a post 34 as in stud 12, holder 28 may be provided with other facilities to orient the hardware and hold it in place. For example, surface 30 of holder 28 may be configured to conform to a corresponding surface of the hardware so as to hold the hardware at the desired installation orientation.

Figure 4:
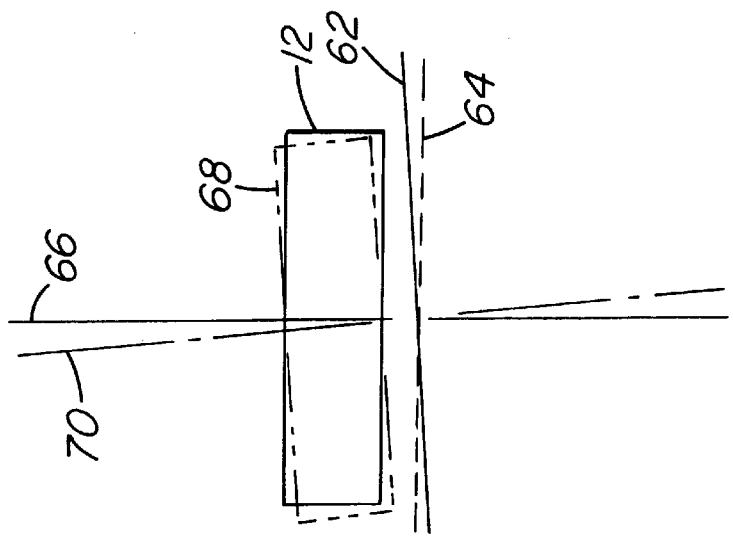
FIG. 4 is a schematic view of a portion of FIG. 2 illustrating variations in the glass curvature at the connection location, with portions removed for clarity.

FIG. 4 illustrates the advantage of using a fixture 16 as described herein. Solid line 62 represents the actual surface of a glass window 10 after the window has been positioned on fixture 16 and dotted line 64 represents the surface of the glass if it were shaped to the designed configuration. As shown in FIG. 4, stud 12 is fixed to surface 62. Because the position of the stud 12 is fixed on fixture 16 relative to the ledge 20 and stops 24, stud 12 is positioned at the required location and in the desired orientation, with posts 34 and 44 (not shown in FIG. 4) aligned along line 66, even though surface 62 does not exactly correspond to desired surface configuration 64. Dotted line 68 shows the position of a stud on surface 62 if it were secured to the window by hand without using the fixture 16 of the present invention. As can be seen, if the stud were applied by hand, it would be expected that the washer of the stud would be positioned generally parallel to surface 62 resulting in posts 34 and 44 of stud 12 being oriented along line 70 rather than along desired line 66.

Figure 5:
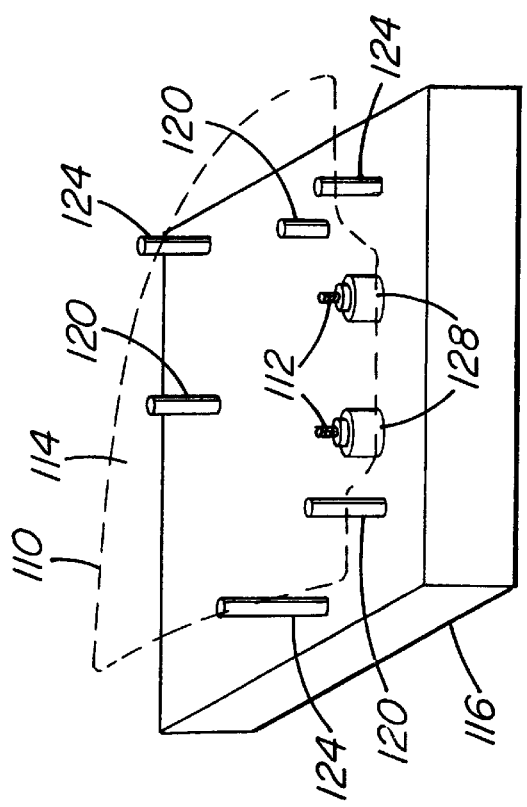
FIG. 5 is a view similar to FIG. 1 illustrating an alternate embodiment of the invention.

In the embodiment of the invention disclosed in FIGS. 1–3, the arrangement used to properly position and orient the stud 12 relative to the desired glass surface shape of a properly configured glass sheet was incorporated into a check fixture which may also be used to check the elevational contour of selected marginal edge portions of a shaped glass window. However, it should be appreciated that the present invention does not require the use of a check fixture. More specifically, fixture 16 may be replaced with an arrangement that merely supports portions of the window in a desired orientation and positions the stud 12 or other mounting hardware at the proper position and orientation relative to the window. For example, and without limiting the present invention, FIG. 5 illustrates a fixture 116 that includes a plurality of pins like three support pins 120 are configured and positioned to contact window 110 at predetermined locations inboard of the window's marginal edge 114. When used in combination with stops 124 or other sheet alignment arrangement, pins 120 position window 110 in a predetermined orientation so that holder 128 can locate and secure hardware 112 to the window 110.

Figure 6:
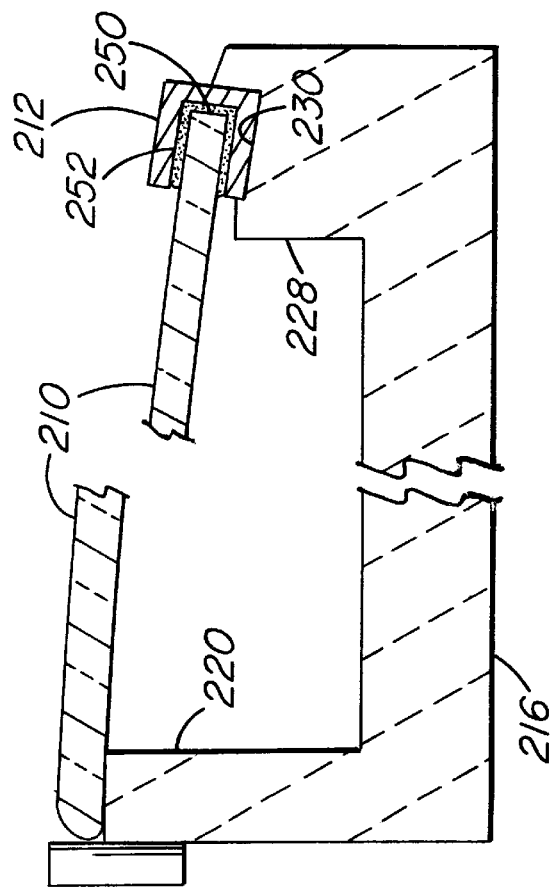
FIG. 6 is a view similar to FIG. 2 illustrating an alternate embodiment of the invention.

In addition, although the present invention is illustrated in combination with a mounting stud, it should be appreciated that the present invention may be used to position and orient other types of hardware that are secured to the window surface or edge or extends through the window, such as but not limited to frames, holders or guides secured along the window edge, or posts or hinges fixed to the glass surface. For example, and without limiting the present invention, FIG. 6 illustrates a fixture 216 which supports window 210 on contoured ledge 220 (or if desired, support pins as discussed earlier). Section 228 is positioned on fixture 216 to support a channel shaped member 212. In FIG. 6, channel member 212 is metal, e.g. aluminum, but it may also be made from other materials commonly used for such hardware, e.g. plastics or rubber. Surface 230 of section 228 is configured to support and hold channel member 212 in a fixed position. In operation, a quick setting adhesive 252 is applied to the inside of channel member 212 which is then positioned on section 228 of fixture 216. Window 210 is then positioned and aligned on ledge 220 as edge 250 of the window 210 is inserted into the channel member 212, while section 228 maintains the position and orientation of the channel member 212. After the adhesive 252 sets a sufficient amount to maintain the position of the channel member 212 on window 210, the window is removed from the fixture 216.

The invention described and illustrated herein represents an illustrative preferred embodiment thereof. It is understood that various changes may be made without departing from the scope of the invention as defined by the claims that follow.

We claim:

1. A fixture for securing hardware to a shaped sheet, comprising:

supports having sheet supporting surfaces generally corresponding to a desired elevational contour of selected proportions of a sheet to be supported by contact on the surfaces; and a hardware holder at a position from the supports to support hardware to be secured to said supported sheet at a predetermined location and orientation corresponding to a desired location and orientation of said hardware when secured to a sheet shaped to a desired configuration.

2. The fixture as in claim 1 wherein said supports include a plurality of pins positioned to contact said sheet to be supported inboard of a marginal edge of said sheet.

3. The fixture as in claim 1 wherein said sheet supporting surfaces correspond to selected marginal edge portions of said sheet to be supported.

4. The fixture as in claim 3 wherein said sheet supporting surfaces correspond to at least three marginal edge portions of said sheet to be supported.

5. The fixture as in claim 3 further including aligning members to properly position said sheet to be supported on said sheet supporting surfaces.

6. The fixture as in claim 5 wherein said aligning members include stop members positioned along said sheet supporting surfaces.

7. The fixture as in claim 5 further including a base member, wherein said supports and holder extend from said base member.

8. The fixture as in claim 1 further including aligning members to properly position said sheet to be supported on said sheet supporting surfaces.

9. A fixture for securing hardware to a shaped glass sheet, comprising:

supports having sheet supporting surfaces and configured to fix a sheet in a predetermined orientation by contact on the surfaces;

a hardware holder to support hardware at a predetermined location and orientation corresponding to a desired location and orientation of said hardware when secured to a sheet having a desired configuration is fixed in said predetermined orientation, hardware for securing to shaped glass sheet, and base member for said supports and holder.

10. The fixture as in claim 9 wherein said supports include a plurality of pins positioned to contact said sheet inboard of a marginal edge of said sheet.

11. The fixture as in claim 9 wherein said supports include a ledge having a sheet supporting surface generally corresponding to selected marginal edge portions of said sheet.

12. A fixture for securing hardware to a shaped sheet, comprising:

supports having sheet supporting surfaces generally corresponding to a desired elevational contour of selected proportions of a sheet to be supported; and a holder to support hardware to be secured to said supported sheet at a predetermined location and orientation corresponding to a desired location and orientation of said hardware when secured to a sheet shaped to a desired configuration; and aligning members to properly position said sheet to be supported on said sheet supporting surfaces wherein the aligning members along with the sheet supporting surfaces establish the position of the supported sheet relative to the supporting surface so that selected marginal edges of the supported sheet are supported and establish a datum corresponding to the desired elevational contour of the marginal edge of the sheet.

13. A fixture for securing hardware to a shaped glass sheet, comprising:

supports configured to fix a sheet in a predetermined orientation; and a holder to support hardware at a predetermined location and orientation corresponding to a desired location and orientation of said hardware when secured to a sheet having a desired configuration is fixed in said predetermined orientation; and wherein said supports include a ledge having a sheet supporting surface generally corresponding to selected marginal edge portions of said sheet and stop members positioned along said ledge to establish the position of the supported sheet relative to the supporting surface so that selected marginal edges of the supported sheet are supported and establish a datum corresponding to the desired elevational contour of the marginal edge of the sheet.

14. The fixture as in claim 1 which includes hardware supported by the hardware holder, where the hardware is to be secured to the shaped sheet.

15. The fixture as in claim 14 wherein the hardware is mounting hardware to be secured to the shaped sheet.

16. A fixture for securing hardware to a shaped sheet, comprising:

supports having sheet supporting surfaces generally corresponding to a desired elevational contour of selected proportions of a sheet to be supported; and a hardware holder at a position from the supports to support a stud member having a post to extend through an opening in said supported sheet at a predetermined location and orientation corresponding to a desired location and orientation of said stud member in said sheet.

* * * * *